United States Patent Office 3,431,099
Patented Mar. 4, 1969

3,431,099
SUBSTITUTED AND UNSUBSTITUTED N-LOWER ALKYL BENZHYDRYLCARBAMATES AS HERBICIDES
David P. Mayer and Sidney B. Richter, Chicago, Ill., assignors to Velsicol Chemical Corporation, a corporation of Delaware
No Drawing. Original application May 10, 1965, Ser. No. 454,746, now Patent No. 3,365,484, dated Jan. 23, 1968. Divided and this application Sept. 27, 1967, Ser. No. 680,286
U.S. Cl. 71—106  9 Claims
Int. Cl. A01n 9/20, 9/12, 5/00

ABSTRACT OF THE DISCLOSURE

A herbicidal composition comprising an inert carrier and as an essential active ingredient, in a quantity toxic to weeds, a compound of the formula

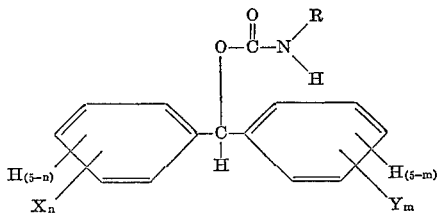

wherein R is alkyl; X and Y are independently selected from the group consisting of halogen, nitro, alkyl, alkenyl, alkoxy, and alkylthio; and $m$ and $n$ are integers from 0 to 5, provided that a maximum of three of X and Y are nitro.

---

This application is a divisional application of our copending application Ser. No. 454,746, filed May 10, 1965, now United States Patent 3,365,484.

This invention relates to new chemical compositions of matter. More particularly, this invention relates to new chemical compositions of the formula

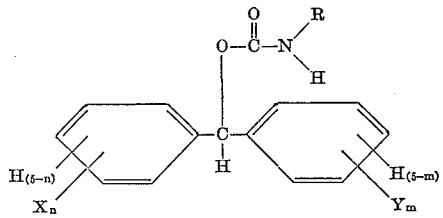

wherein R is alkyl; X and Y are independently selected from the group consisting of halogen, nitro, alkyl, alkenyl, alkoxy, and alkylthio; and $m$ and $n$ are integers from 0 to 5, provided that maximum of three of X and Y are nitro. In a preferred embodiment of this invention R is lower alkyl; X and Y are independently selected from the group consisting of chlorine, bromine, nitro, lower alkyl, lower alkenyl, lower alkoxy and lower alkylthio; and $m$ and $n$ are integers from 0 to 5, provided that a maximum of three of X and Y are selected from the group consisting of nitro.

Unexpectedly, the compounds of the present invention are effective as herbicides and useful in controlling undesirable plant life. Exemplary of compounds of the present invention are:

N-methylbenzhydrylcarbamate,
N-methyl-2-chlorobenzhydrylcarbamate,
N-methyl-3-chlorobenzhydrylcarbamate,
N-methyl-4-chlorobenzhydrylcarbamate,
N-methyl-4-bromobenzhydrylcarbamate,
N-methyl-4,4'-dichlorobenzhydrylcarbamate,
N-methyl-4,4'-dibromobenzhydrylcarbamate,
N-methyl-4,4'-difluorobenzhydrylcarbamate,
N-methyl-4-bromo-4'-chlorobenzhydrylcarbamate,
N-methyl-2-chloro-4'-fluorobenzhydrylcarbamate,
N-methyl-2,2'-dichlorobenzhydrylcarbamate,
N-methyl-2,3'-dichlorobenzhydrylcarbamate,
N-methyl-2,4'-dichlorobenzhydrylcarbamate,
N-methyl-3,3'-dichlorobenzhydrylcarbamate,
N-methyl-3,4'-dichlorobenzhydrylcarbaramate,
N-methyl-2,6'-dichlorobenzhydrylcarbamate,
N-methyl-2,2',4,4',5,5'-hexachlorobenzhydrylcarbamate,
N-methyl-2,2',3,3',4,4',5,5',6,6'-decafluorobenzhydrylcarbamate,
N-methyl-2-nitrobenzhydrylcarbamate,
N-methyl-3-nitrobenzhydrylcarbamate,
N-methyl-4-nitrobenzhydrylcarbamate,
N-methyl-3-bromo-5-nitrobenzhydrylcarbamate,
N-methyl-3,5-dinitrobenzhydrylcarbamate,
N-methyl-3,3'-dinitrobenzhydrylcarbamate,
N-methyl-2-methylbenzhydrylcarbamate,
N-methyl-3-methylbenzhydrylcarbamate,
N-methyl-4-methylbenzhydrylcarbamate,
N-methyl-2,2'-dimethylbenzhydrylcarbamate,
N-methyl-2,3-dimethylbenzhydrylcarbamate,
N-methyl-2,4'-dimethylbenzhydrylcarbamate,
N-methyl-4,4'-dimethylbenzhydrylcarbamate,
N-methyl-3,5-dimethylbenzhydrylcarbamate,
N-methyl-2,4,6-trimethylbenzhydrylcarbamate,
N-methyl-4-tert-butylbenzhydrylcarbamate,
N-methyl-4,4'-di-tert-butylbenzhydrylcarbamate,
N-methyl-2,2'-dimethoxybenzhydrylcarbamate,
N-methyl-2,3'-dimethoxybenzhydrylcarbamate,
N-methyl-2,4'-dimethoxybenzhydrylcarbamate,
N-methyl-2,4-dimethoxybenzhydrylcarbamate,
N-methyl-3,4-dimethoxybenzhydrylcarbamate,
N-methyl-2-methoxy-5-chlorobenzhydrylcarbamate,
N-methyl-2-chloro-2'-methylbenzhydrylcarbamate,
N-methyl-2-chloro-3'-methylbenzhydrylcarbamate,
N-methyl-2-chloro-4'-methylbenzhydrylcarbamate,
N-methyl-2,4'-dichloro-3,3'-dimethoxybenzhydrylcarbamate,
N-methyl-4,4'-dichloro-3,3'-dinitrobenzhydrylcarbamate,
N-methyl-4,4'-dimethoxy-2,2',6,6'-tetramethylbenzhydrylcarbamate,
N-methyl-4,4'-diethylbenzhydrylcarbamate,
N-methyl-2-butylbenzhydrylcarbamate,
N-methyl-3-sec-butylbenzhydrylcarbamate,
N-methyl-4-cyclohexylbenzhydrylcarbamate,
N-methyl-3,5-dimethyl-4-propylbenzhydrylcarbamate,
N-methyl-2,2',3,4,5,6-hexamethylbenzhydrylcarbamate,
N-methyl-4-(nonylthio)benzhydrylcarbamate,
N-methyl-2-methyl-4'-chlorobenzhydrylcarbamate,
N-ethyl-benzhydrylcarbamate,
N-n-propyl-benzhydrylcarbamate,
N-isopropyl benzhydrylcarbamate,
N-ethyl-2-chlorobenzhydrylcarbamate,
N-n-propyl-3-chlorobenzhydrylcarbamate,
N-isopropyl-4-chlorobenzhydrylcarbamate,
N-ethyl-4-bromobenzhydrylcarbamate,
N-ethyl-2-chloro-4'-fluorobenzhydrylcarbamate
N-isopropyl-3,3'-dichlorobenzhydrylcarbamate,
N-ethyl-3-nitrobenzhydrylcarbamate,
N-n-propyl-2-methylbenzhydrylcarbamate,
N-isopropyl-2,3-dimethylbenzhydrylcarbamate,
N-ethyl-2,2'-dimethoxybenzhydrylcarbamate,
N-isopropyl-2,4'-dichloro-3,3'-dimethoxybenzhydrylcarbamate, and the like.

These compounds can be prepared readily by reacting a suitable benzhydrol with an alkylisocyanate. The reaction can be conveniently carried out in a suitable solvent such as benzene, dioxane, and the like. An excess of a suitable alkyl isocyanate is preferably utilized in this reaction. The reaction mixture is heated, for example at reflux if benzene or dioxane is utilized, for from about 6 to about 24 hours with stirring. A catalyst such as triethylamine can also be utilized. The solvent is removed from the reaction mixture and the desired compound recovered by methods common to the art such as by boiling with charcoal and recrystallizing from a suitable solvent.

Exemplary of suitable benzhydrol reactants useful in the preparation of the compounds of the present invention are:

benzhydrol,
2-chlorobenzhydrol,
3-chlorobenzhydrol,
4-chlorobenzhydrol,
4-bromobenzhydrol,
4,4'-dichlorobenzhydrol,
4,4'-dibromobenzhydrol,
4,4'-difluorobenzhydrol,
4-bromo-4'-chlorobenzhydrol,
2-chloro-4'-fluorobenzhydrol,
2,2'-dichlorobenzhydrol,
2,3'-dichlorobenzhydrol,
2,4'-dichlorobenzhydrol,
3,3'-dichlorobenzhydrol,
3,4'-dichlorobenzhydrol,
2,6'-dichlorobenzhydrol,
2,2',4,4',5,5'-hexachlorobenzhydrol,
2,2',3,3',4,4',5,5',6,6'-decafluorobenzhydrol,
2-nitrobenzhydrol,
3-nitrobenzhydrol,
4-nitrobenzhydrol,
3-bromo-5-nitrobenzhydrol,
3,5-dinitrobenzhydrol,
3,3'-dinitrobenzhydrol,
2-methylbenzhydrol,
3-methylbenzhydrol,
4-methylbenzhydrol,
2,2'-dimethylbenzhydrol,
2,3-dimethylbenzhydrol,
2,4'-dimethylbenzhydrol,
4,4'-dimethylbenzhydrol,
3,5-dimethylbenzhydrol,
2,4,6-trimethylbenzhydrol,
4-tert-butylbenzhydrol,
4,4'-di-tert-butylbenzhydrol,
2,2'-dimethoxybenzhydrol,
2,3'-dimethoxybenzhydrol,
4,4'-dimethoxybenzhydrol,
2,4-dimethoxybenzhydrol,
3,4-dimethoxybenzhydrol,
2-methoxy-5-chlorobenzhydrol,
2-chloro-2'-methylbenzhydrol,
2-chloro-3'-methylbenzhydrol,
2-chloro-4'-methylbenzhydrol,
2,4'-dichloro-3,3'-dimethoxybenzhydrol,
4,4'-dichloro-3,3'-dinitrobenzhydrol,
4,4'-dimethoxy-2,2'-6,6'-tetramethylbenzhydrol,
4,4'-diethylbenzhydrol,
2-butylbenzhydrol,
3-sec-butylbenzhydrol,
4-cyclohexylbenzhydrol,
3,5-dimethyl-4-propylbenzhydrol,
2,2',3,4,5,6-hexamethylbenzhydrol,
4-(nonylthio)benzhydrol,
2-methyl-4'-chlorobenzhydrol,
and the like.

Suitable alkyl isocyanates for use in the preparation of the compounds of this invention are mono lower alkyl isocyanates, such as: methylisocyanate, ethylisocyanate, n-propylisocyanate, isopropylisocyanate, and the like.

The manner in which the new compounds of the present invention can be prepared readily is illustrated in the following examples:

EXAMPLE 1

Preparation of N-methyl-benzhydrylcarbamate

Benzhydrol (10 g.), methylisocyanate (10 g.) and dioxane (100 ml.) were placed in a 250 ml. three-neck, round-bottom flask equipped with a mechanical stirrer, internal thermometer and reflux condenser. The mixture was stirred and heated at reflux for about 16 hours. Dioxane was removed from the reaction mixture by warming the mixture under reduced pressure. The residue was dissolved in anhydrous diethyl ether. The ethereal solution was washed with water and dried over anhydrous magnesium sulfate. The diethyl ether was removed by heating in vacuo and the residue distilled in vacuo to remove unreacted benzhydrol as the fraction collected at 100°–105° C. at 0.2 mm. mercury pressure. The residue remaining solidified on cooling to a solid having a melting point of 72–82° C. The residue was recrystallized from ethanol to yield the desired N-methyl benzhydrylcarbamate as a white solid melting 93.5–95° C. and having the following elemental analysis as calculated for $C_{15}H_{15}NO_2$: Theoretical, percent: C, 74.66; H, 6.27; N, 5.81. Found, percent: C, 74.98; H, 6.55; N, 5.66.

EXAMPLE 2

Preparation of N-methyl-4-chlorobenzhydrylcarbamate 4-chlorobenzhydrol (22 g.; 0.1 mol), methylisocyanate (12 g.; 0.2 mol), triethylamine (3 g.) and benzene (75 ml.) were placed in a 250 ml. three-neck round bottomed flask equipped with a mechanical stirrer, internal thermometer and reflux condenser. The mixture was stirred and heated at reflux for about 17 hours. Benzene was removed from the reaction mixture by warming the mixture under reduced pressure. The residue was dissolved in anhydrous diethyl ether. The ethereal solution was filtered and the filtrate evaporated under reduced pressure on a steam bath to obtain a viscous residue. The residue was triturated with petroleum ether. The mixture was filtered and the solid residue melting 63–70° C. was recovered. This solid was recrystallized from dilute ethanol to yield an oily product which was dissolved in hot heptane and cooled to room temperature to yield a solid product. This product was recrystallized from hexane to yield N-methyl-4-chlorobenzhydrylcarbamate melting 86–87° C. and having the following elemental analysis as calculated for $C_{15}H_{14}ClNO_2$: Theoretical, percent: C, 65.34; H, 5.12; Cl, 12.86; N, 5.08. Found, percent: C, 66.24; H, 5.38; Cl, 12.29; N, 5.17.

EXAMPLE 3

Preparation of N-methyl-3-chlorobenzhydrylcarbamate 3-chlorobenzhydrol (11 g.; 0.05 mol), methyl-isocyanate (6 g.; 0.1 mol), triethylamine, (3 g.) and benzene (60 ml.) were placed in the apparatus described in the previous examples and heated with stirring at reflux for about 17 hours. Benzene was removed from the mixture by heating on a steam bath under reduced pressure to yield an off-white solid melting 60–62.5° C. The product was recrystallized from hexane-pentane mixture to yield N-methyl - 3 - chlorobenzhydrylcarbamate as a white solid melting 67–68° C. and having the following elemental analysis as calculated for $C_{15}H_{14}ClNO_2$: Theoretical, percent: C, 65.34; H, 5.12; Cl, 12.86; N, 5.08. Found, percent: C, 65.14; H, 5.14; Cl, 12.82; N, 5.08.

EXAMPLE 4

Preparation of N-methyl-2-methylbenzhydrylcarbamate 2-methylbenzhydrol (10.0 g.; 0.05 mol), methylisocyanate (6 g.; 0.1 mol), triethylamine (3 g.) and benzene (60 ml.) were placed in the apparatus described in the previous examples and heated with stirring at reflux for about 17 hours. Upon cooling the mixture was filtered and evaporated on a steam bath under reduced pressure. The solution was mixed with acetone, charcoal added and heated to boiling. The mixture was filtered and heated on a steam bath in vacuo for about ½ hour to yield N-methyl-2-methylbenzhydrylcarbamate as a colorless, very viscous liquid having the following elemental analysis as calculated for $C_{10}H_{17}NO_2$: Theoretical, percent: C, 75.27; H, 6.71; N, 5.49. Found, percent: C, 74.89; H, 7.03; N, 5.79.

EXAMPLE 5

Preparation of N-methyl-2,5-dimethyl-benzhydrylcarbamate 2,5-dimethylbenzhydrol (11 g.; 0.05 mol), methylisocyanate (6 g.; 0.1 mol), triethylamine (3 ml.) and benzene (60 ml.) were placed in the apparatus described in the previous examples and heated with stirring at reflux for about 17 hours. The reaction mixture was cooled to room temperature, filtered and evaporated under reduced pressure on a steam bath to obtain a solid residue. The residue was recrystallized from dilute ethanol to obtain N-methyl-2,5-dimethylbenzhydrylcarbamate as a white solid melting 102.5–104° C. and having the following elemental analysis as calculated for $C_{17}H_{19}NO_2$: Theoretical, percent: C, 75.81; H, 7.11; N, 5.20. Found, percent: C, 75.33; H, 7.10; N, 5.20.

EXAMPLE 6

Preparation of N-methyl-2,3-dimethyl-benzhydrylcarbamate 2,3-dimethylbenzhydrol (11 g.; 0.05 mol), methylisocyanate (8 g.; 0.14 mol), a few drops of triethylamine and xylene (100 ml.) were heated with stirring as described in the previous examples. The mixture was heated on a steam bath under reduced pressure to remove xylene solvent. The mixture was treated as described in the previous examples to yield a pale yellow residue which was dissolved in acetone, boiled with charcoal, filtered, and evaporated under reduced pressure and then on a steam bath in vacuo for 2 hours to yield N-methyl-2,3-dimethylbenzhydrylcarbamate as a viscous liquid having the following elemental analysis as calculated for $C_{17}H_{19}NO_2$: Theoretical, percent: C, 75.81; H, 7.11; N, 5.20. Found, percent: C, 75.42; H, 7.70; N, 5.52.

EXAMPLE 7

Preparation of N-methyl-4,4'-dichloro-benzhydrylcarbamate 4,4'-dichlorobenzhydrol (3.2 g.; 0.13 mol), methylisocyanate (3 g.; 0.052 mol), a few drops of triethylamine and benzene (100 ml.) were heated with stirring as described in the previous examples. Benzene was removed from the reaction mixture under reduced pressure. The residue was dissolved in acetone, boiled with charcoal, filtered, and the acetone evaporated under reduced pressure. The residue was heated at 180° C. under 0.05 mm. Hg pressure for one hour to remove volatiles and recover N-methyl-4,4'-dichlorobenzhydrylcarbamate as a very viscous, pale yellow liquid residue having the following elemental analysis as calculated for $C_{14}H_{13}Cl_2NO_2$: Theoretical, percent: C, 58.08; H, 4.22; Cl, 22.86; N, 4.52. Found, percent: C, 58.08; H, 4.73; Cl, 22.30; N, 4.87.

Other compounds within the scope of the present invention can be prepared readily in the manner heretofore described. Presented in the following examples are the essential reactants required to prepare the indicated named compounds according to the procedure detailed in the foregoing examples.

EXAMPLE 8

2 - nitrobenzhydrol+methylisocyanate=N - methyl - 2-nitrobenzhydrylcarbamate.

EXAMPLE 9

2 - methoxy - 5 - chlorobenzhydrol+methylisocyanate =N-methyl-2-methoxy-5-chlorobenzhydrylcarbamate.

EXAMPLE 10

3 - methylbenzhydrol+methylisocyanate=N - methyl-3-methylbenzhydrylcarbamate.

EXAMPLE 11

Benzhydrol+ethylisocyanate=N - ethylbenzhydrylcarbamate.

EXAMPLE 12

Benzhydrol+n - propylisocyanate=N - n - propyl-benzhydrylcarbamate.

EXAMPLE 13

Benzhydrol+iso - propylisocyanate - N - iso - propyl-benzhydrylcarbamate.

EXAMPLE 14

3 - chlorobenzhydrol+n - propylisocyanate=N - n-propyl-3-chlorobenzhydrylcarbamate.

EXAMPLE 15

2 - chloro - 4' - fluorobenzhydrol+ethylisocyanate=N-ethyl-2-chloro-4'-fluorobenzhydrylcarbamate.

EXAMPLE 16

2 methylbenzhydrol+iso - propylisocyanate=N - iso-propyl-2-methylbenzhydrylcarbamate.

EXAMPLE 17

2,3 - dimethylbenzhydrol+ethylisocyanate=N - ethyl-2,3-dimethylbenzhydrylcarbamate.

EXAMPLE 18

2,3' - dimethoxybenzhydrol+ethylisocyanate=N-ethyl-2,3'-dimethoxybenzhydrylcarbamate.

EXAMPLE 19

2 - chlorobenzhydrol+methylisocyanate=N-methyl-2-chlorobenzhydrylcarbamate.

For practical use as herbicides, the compounds of this invention are generally incorporated into herbicidal compositions which comprise an inert carrier and a herbicidally toxic amount of such a compound. Such herbicidal compositions, which can also be called formulations, enable the active compound to be applied conveniently to the site of the weed infestation in any desired quantity. These compositions can be solids such as dusts, granules, or wettable powders; or they can be liquids such as solutions, aerosols, or emulsifiable concentrates.

For example, dusts can be prepared by grinding and blending the active compound with a solid inert carrier such as the talcs, clays, silicas, pyropyllite, and the like. Granular formulations can be prepared by impregnating the compound, usually dissolved in a suitable solvent, onto and into granulated carriers such as the attapulgites or the vermiculites, usually of a particle size range of from about 0.3 to 1.5 mm. Wettable powders, which can be dispersed in water or oil to any desired concentration of the active compound, can be prepared by incorporating wetting agents into concentrated dust compositions.

In some cases the active compounds are sufficiently soluble in comon organic solvents such a kerosene or xylene so that they can be used directly as solutions in these solvents. Frequently, solutions of herbicides can be dispersed under superatmospheric pressure as aerosols. However, preferred liquid herbicidal compositions are emulsifiable concentrates, which comprise an active compound according to this invention and as the inert carrier, a solvent and an emulsifier. Such emulsifiable concentrates can be extended with water and/or oil to any desired concentration of active compound for application as sprays to the site of the weed infestation. The emulsifiers most commonly used in these concentrates are nonionic or mixtures of nonionic with anionic surface-active agents. With the use of some emulsifier systems an inverted emulsion (water-in-oil) can be prepared for direct application to weed infestations.

A typical herbicidal composition according to this invention is illustrated by the following example, in which the quantities are in parts by weight.

EXAMPLE 20

Preparation of a dust

| | |
|---|---|
| Product of Example 1 | 10 |
| Powdered talc | 90 |

The above ingredients are mixed in a mechanical grinder-blender and are ground until a homogeneous, free-flowing dust of the desired particle size is obtained. This dust is suitable for direct application to the site of the weed infestation.

The compounds of this invention can be applied as herbicides in any manner recognized by the art. One method for the control of weeds comprises contacting the locus of said weeds with a herbicidal composition comprising an inert carrier and as an essential active ingredient, in a quantity which is herbicidally toxic to said weeds, a compound of the present invention. The concentration of the new compounds of this invention in the herbicidal compositions will vary greatly with the type of formulation and the purpose for which it is designed, but generally the herbicidal compositions will comprise from about 0.05 to about 95 percent by weight of the active compounds of this invention. In a preferred embodiment of this invention, the herbicidal compositions will comprise from about 5 to about 75 percent by weight of the active compound. The compositions can also comprise such additional substances as other pesticides, such as insecticides, nematocides, fungicides, and the like; stabilizers, spreaders, deactivators, adhesives, stickers, fertilizers, activators, synergists, and the like.

The compounds of the present invention are also useful when combined with other herbicides and/or defoliants, dessicants, growth inhibitors, and the like, in the herbicidal compositions heretofore described. These other materials can comprise from about 5% to about 95% of the active ingredients in the herbicidal compositions. Use of combinations of these other herbicides and/or defoliants, dessicants, etc. with the compound of the present invention provide herbicidal compositions which are more effective in controlling weeds and often provide results unattainable with separate compositions of the individual herbicides. The other herbicides, defoliants, dessicants and plant growth inhibitors, with which the compounds of this invention can be used in the herbicidal composition to control weeds, can include chlorophenoxy herbicides such as 2,4-D, 2,4,5-T, MCPA, MCPB, 4(2,4-DB), and the like; carbamate herbicides such as IPC, CIPC, swep, barban, and the like; thiocarbamate and dithiocarbamate herbicides such as CDEC, metham sodium, EPTC, diallate, PEBC, and the like; substituted urea herbicides such as dichloral urea, fenuron, monuron, diuron, linuron, neburon, and the like; symmetrical triazine herbicides such as simazine, chlorazine, atrazine, trietazine, simetone, prometone, propazine, ametryne, and the like; chloroacetamide herbicides such as alpha-chloro-N,N-dimethylacetamide, CDEA, alpha - chloro - N-isopropylacetamide, 4-(chloroacetyl)morpholine, 1-(chloroacetyl) piperdine, and the like; chlorinated aliphatic acid herbicides such as TCA, dalapon, 2,3-dichloropropionic acid, and the like, chlorinated benzoic acid and phenylacetic acid herbicides such as 2,3,6-TBA, 2,3,5,6-TBA, dicamba, tricamba, amiben, fenac, 2-methoxy-3,6-dichlorophenylacetic acid, 3-methoxy-2,6-dichlorophenylacetic acid, 2-methoxy-3,5,6-trichlorophenylacetic acid, and the like; and such compounds as aminotriazole, maleic hydrazide, phenyl mercuric acetate, endothal, biuret, technical chlordane, dimethyl 2,3,5,6 - tetrachloroterephthalate, diquat, erbon, DNC, DNBP, dichlobenil; DPA, diphenamid, dipropalin, trifluralin, solan, dicryl, merphos, DMPA and the like. Such herbicides can also be used in the methods and compositions of this invention in the form of their salts, esters, amides, and other derivatives whenever applicable to the particular parent compounds.

Weeds are undesirable plants growing where they are not wanted, having no economic value, and interfering with the production of cultivated crops, with the growing of ornamental plants, or with the welfare of livestock. Many types of weeds are known including annuals such as pigweed, lambsquarters, foxtail, crabgrass, wild mustard, field pennycress, ryegrass, goose-grass, chickweed, wild oats, velvet leaf, purselane, barnyard grass, and smartweed; biennials such as wild carrot, great burdock, mullein, round-leaved mallow, blue thistle, bull thistle, hounds-tongue, moth mullein, and purple star thistle; or perennials such as white cockle, perennial rye-grass, quackgrass, Johnson grass, Canada thistle, hedge bindweed, Bermuda grass, sheep sorrel, curly dock, nutgrass, field chickweed, and winter-cress. Similarly, such weeds can be classified as broadleaf or grassy weeds. It is economically desirable to control the growth of such weeds without damaging beneficial plants or livestock.

The new compounds of this invention are particularly valuable for weed control because they are toxic to many species and groups of weeds while they are relatively nontoxic to many beneficial plants. The exact amount of compound required will depend on a variety of factors, including the hardiness of the particular weed species, weather, type of soil, method of application, the kind of beneficial plants in the same area, and the like. Thus, while the applications of up to only about one or two ounces of active compound per acre may be sufficient for good control of a light infestation of weeds growing under adverse conditions, the application of ten pounds or more of active compound per acre may be required for good control of a dense infestation of hardy perennial weeds growing under favorable conditions.

The herbicidal toxicity of the new compounds of this invention can be illustrated by many of the established testing techniques known to the art, such as pre- and post-emergence testing. In one pre-emergence test, emulsifiable concentrates or solutions prepared as heretofore described can be extended with water or oil or other suitable extenders, to obtain various concentrations of the active compound. These concentrates are sprayed on the surface of soil which had been seeded less than twenty-four hours earlier with weed seeds. After spraying the soil containers are maintained under normal lighting conditions and supplied with heat as required and daily or more frequent watering. The weeds are observed for about 7 to about 20 days, and the degree of injury to the weeds is recorded. The results indicate that compounds of this invention possess a high order of herbicidal activity.

To demonstrate the post-emergence activity of the compounds of this invention, emulsifiable concentrates or solutions of various concentrations of the aforementioned active compounds are sprayed on the foliage of weeds that have attained a prescribed size. After spraying, the weeds are maintained under normal lighting conditions and supplied with heat as required. The soil in which the weeds are growing is watered daily or more frequently. The weeds are observed periodically for up to 14 days or more, and the severity of injury to the weeds is recorded. The results indicate that the compounds of this invention possess a high order of herbicidal activity.

The herbicidal activity of the compounds of this invention was demonstrated by experiments carried out for the pre-emergence control of dock. In these experiments, small plastic greenhouse pots filled with dry soil were seeded with dock. Twenty-four hours or less after seeding, the pots were sprayed with water until the soil was wet, and the test compounds formulated as aqueous emulsions of acetone solutions containing emulsifiers, were sprayed at the indicated concentrations on the surface of the soil. After spraying, the soil containers were placed in the greenhouse and provided with supplementary heat as required and daily or more frequent watering. The plants were maintained under these conditions for a period of from 15 to 21 days, at which time the condition of the plants and the degree of injury to the plants were rated on a scale of from 0 to 10, with 0 denoting no injury and 10 denoting total death of the plant. The results were as follows:

| Test Compound | Conc'n Actual Compound, lbs./acre | Injury Rating |
|---|---|---|
| Product of Example 1 | 1 | 9 |
| Do | 2 | 9 |
| Do | 4 | 9 |
| Do | 8 | 10 |
| Product of Example 3 | 2 | 8 |
| Do | 8 | 10 |
| Product of Example 4 | 2 | 9 |
| Do | 8 | 10 |
| Product of Example 5 | 2 | 8 |
| Do | 8 | 9 |
| Product of Example 6 | ½ | 9 |
| Do | 1 | 9 |
| Do | 2 | 9 |
| Do | 4 | 9 |
| Do | 8 | 9 |
| Control | | 0 |

The products of the present invention can also be used for the control of fungus growth. When the compounds of this invention are used as agricultural fungicides for desirable crops, they can be applied to plant foliage, to seeds, to the soil, or to such parts of plants as the fruits themselves. Plants are susceptible to a great many fungi which cause widespread damage; and among some of the more important which can be mentioned are late blight on tomato, powdery mildew of cucumber, cereal leaf rust on wheat, and such common soil fungi as fusarium wilt (*Fusarium oxysporum*), the seed rot fungus *Phythium deboranum*, and the sheath and culm blight *Rhizoctonia solani*. The new compounds of this invention can also be employed as industrial fungicides to control a variety of fungi which attack such materials as adhesives, cork, paints, lacquers, leather, wood, plastics, and textiles such as cotton or wool. The compositions and techniques described above for the use of these compounds as herbicides can also be used when the compounds are used as fungicides.

We claim:
1. A herbicidal composition comprising an inert carrier and as an essential active ingredient, in a quantity toxic to weeds, a compound of the formula

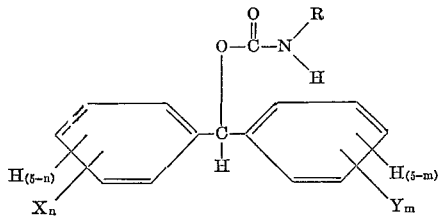

wherein R is lower alkyl; X and Y are independently selected from the group consisting of chlorine, bromine, nitro, lower alkyl, lower alkenyl, lower alkoxy, and lower alkylthio; and $m$ and $n$ are integers from 0 to 5, provided that a maximum of three of X and Y are nitro.

2. A method for destroying weeds which comprises applying to said weeds the herbicidal composition of claim 1.

3. The method of claim 2 wherein the essential active ingredient is N-methyl benzhydrylcarbamate.

4. The method of claim 2 wherein the essential active ingredient is N-methyl 2-methylbenzhydrylcarbamate.

5. The method of claim 2 wherein the essential active ingredient is N-methyl 2-chlorobenzhydrylcarbamate.

6. The method of claim 2 wherein the essential active ingredient is N-methyl 3-chlorobenzhydrylcarbamate.

7. The method of claim 2 wherein the essential active ingredient is N-methyl 2,3-dimethylbenzhydrylcarbamate.

8. The method of claim 2 wherein the essential active ingredient is N-methyl 2,5-dimethylbenzhydrylcarbamate.

9. The method of claim 2 wherein the essential active ingredient is N-methyl-3-methylbenzhydrylcarbamate.

References Cited

UNITED STATES PATENTS

| | | | |
|---|---|---|---|
| 2,776,197 | 1/1957 | Gysin | 71—70 |
| 2,913,484 | 11/1959 | Gordon | 260—476 |
| 3,046,302 | 7/1962 | Oja | 260—482 |
| 3,077,494 | 2/1963 | Griffith | 260—471 |
| 3,238,036 | 3/1966 | Herret | 71—70 |
| 3,340,294 | 9/1967 | Richter et al. | 260—482 |

FOREIGN PATENTS 1,397,525  3/1965  France.

OTHER REFERENCES

Tharrington et al.: Proc. Northeast. Weed control cont., 19, 251-3 and 258 (1965).

LEWIS GOTTS, *Primary Examiner.*

MELVYN M. KASSENOFF, *Assistant Examiner.*

U.S. Cl. X.R.

71—87, 88, 92, 93, 94, 97, 98, 100, 105; 424—300